(12) United States Patent
Anang et al.

(10) Patent No.: US 11,827,298 B2
(45) Date of Patent: Nov. 28, 2023

(54) VEHICLE KNUCKLE

(71) Applicant: KABUSHIKI KAISHA RIKEN, Tokyo (JP)

(72) Inventors: Cakrawala Anang, Tokyo (JP); Tadaaki Kanbayashi, Tokyo (JP); Shuichi Kusama, Tokyo (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 13 days.

(21) Appl. No.: 17/594,261

(22) PCT Filed: Apr. 10, 2020

(86) PCT No.: PCT/JP2020/016175
§ 371 (c)(1),
(2) Date: Oct. 8, 2021

(87) PCT Pub. No.: WO2020/209376
PCT Pub. Date: Oct. 15, 2020

(65) Prior Publication Data
US 2022/0161847 A1 May 26, 2022

(30) Foreign Application Priority Data
Apr. 10, 2019 (JP) ................................. 2019-075125

(51) Int. Cl.
*B62D 7/18* (2006.01)

(52) U.S. Cl.
CPC ...................................... *B62D 7/18* (2013.01)

(58) Field of Classification Search
CPC .. B62D 7/18; B60G 13/005; B60G 2204/129; B60G 2206/50
See application file for complete search history.

(56) References Cited

U.S. PATENT DOCUMENTS 1,721,606 A * 7/1929 Sullenger ................. B62D 7/18
                                                       301/63.101
3,940,159 A * 2/1976 Pringle .................... B62D 7/18
                                                       188/18 A
(Continued)

FOREIGN PATENT DOCUMENTS

GB        2340093 A      2/2000
JP     2012143788 A      8/2012
(Continued)

OTHER PUBLICATIONS

Sep. 28, 2021, International Preliminary Report on Patentability issued in the International Patent Application No. PCT/JP2020/016175.

(Continued)

*Primary Examiner* — Paul N Dickson
*Assistant Examiner* — Timothy Wilhelm
(74) *Attorney, Agent, or Firm* — KENJA IP LAW PC (57) ABSTRACT

A vehicle knuckle (1) includes a main body portion (10) for supporting an axle, a strut connecting portion (11) for connecting a strut, and an arm portion (12) for connecting the main body portion (10) and the strut connecting portion (11) and having a space (18) inside. The arm portion (12) includes a sidewall portion (120) for connecting the main body portion (10) and the strut connecting portion (11), and has a first through hole (17a) communicating with the space (18), at a coupling portion (12a) with the main body portion (10). The sidewall portion (120) is free of a through hole communicating with the space (18).

4 Claims, 6 Drawing Sheets

(56) References Cited

U.S. PATENT DOCUMENTS

| | | | | |
|---|---|---|---|---|
| 4,565,389 | A * | 1/1986 | Kami | B60G 21/055 |
| | | | | 280/124.137 |
| 4,842,296 | A * | 6/1989 | Kubo | B60G 3/26 |
| | | | | 280/124.136 |
| 4,951,959 | A * | 8/1990 | Watanabe | B60G 7/008 |
| | | | | 280/124.136 |
| 5,120,150 | A * | 6/1992 | Kozyra | B60G 7/008 |
| | | | | 403/297 |
| 5,366,233 | A * | 11/1994 | Kozyra | B60T 1/065 |
| | | | | 280/93.512 |
| 5,380,035 | A * | 1/1995 | Lee | B60G 3/265 |
| | | | | 280/124.145 |
| 5,496,055 | A * | 3/1996 | Shibahata | B62D 7/18 |
| | | | | 280/124.141 |
| 5,829,768 | A * | 11/1998 | Kaneko | B23P 15/00 |
| | | | | 280/124.134 |
| 6,099,003 | A * | 8/2000 | Olszewski | B62D 7/18 |
| | | | | 280/124.125 |
| D538,316 | S * | 3/2007 | Sadanowicz | D15/143 |
| 7,234,712 | B2 * | 6/2007 | Yamazaki | B62D 7/18 |
| | | | | 280/93.51 |
| 7,302,994 | B2 * | 12/2007 | Mautino | B22C 9/22 |
| | | | | 164/137 |
| 7,398,982 | B2 * | 7/2008 | Hozumi | B62D 7/18 |
| | | | | 280/124.135 |
| 8,061,726 | B2 * | 11/2011 | Kunert | B60G 3/20 |
| | | | | 280/124.144 |
| 8,444,160 | B2 * | 5/2013 | Okamoto | B60G 3/20 |
| | | | | 280/124.135 |
| 9,308,578 | B2 * | 4/2016 | Smerecky | B22D 15/00 |
| 9,403,564 | B1 * | 8/2016 | Al-Huwaider | B60G 99/00 |
| 9,643,646 | B2 * | 5/2017 | Conner | B62D 7/18 |
| 9,643,647 | B2 * | 5/2017 | Conner | B60G 7/001 |
| 9,796,235 | B2 * | 10/2017 | Matayoshi | B60G 15/067 |
| 10,315,695 | B2 * | 6/2019 | Kleemann | B60G 3/202 |
| 10,377,418 | B2 * | 8/2019 | Sakuma | B62D 7/18 |
| 10,414,228 | B2 * | 9/2019 | Bosch | B60G 7/008 |
| D864,798 | S * | 10/2019 | Sun | D12/159 |
| 11,021,187 | B2 * | 6/2021 | Johnson | B62D 7/18 |
| 2003/0010412 | A1 * | 1/2003 | Matsumoto | B21J 5/00 |
| | | | | 148/552 |
| 2003/0107201 | A1 * | 6/2003 | Chun | B62D 7/18 |
| | | | | 280/124.135 |
| 2004/0151615 | A1 * | 8/2004 | Kotani | C22C 21/02 |
| | | | | 420/544 |
| 2005/0184021 | A1 * | 8/2005 | Mautino | B61G 3/06 |
| | | | | 213/118 |
| 2005/0247502 | A1 * | 11/2005 | Ziech | B62D 7/18 |
| | | | | 280/93.512 |
| 2011/0025009 | A1 * | 2/2011 | Neumann | B21J 5/00 |
| | | | | 164/520 |
| 2012/0049477 | A1 * | 3/2012 | Webster | B22D 18/04 |
| | | | | 164/63 |
| 2013/0181421 | A1 * | 7/2013 | Rohde | B62D 7/18 |
| | | | | 29/898.042 |
| 2019/0256135 | A1 * | 8/2019 | Kwon | B62D 7/18 |

FOREIGN PATENT DOCUMENTS

| | | |
|---|---|---|
| JP | 2017100484 A | 6/2017 |
| JP | 2017537016 A | 12/2017 |

OTHER PUBLICATIONS

Jun. 16, 2020, International Search Report issued in the International Patent Application No. PCT/JP2020/016175.

Mar. 1, 2022, Office Action issued by the China National Intellectual Property Administration in the corresponding Chinese Patent Application No. 202080021533.1.

\* cited by examiner

VEHICLE KNUCKLE

FIELD OF THE INVENTION

The present invention relates to a vehicle knuckle, and more particularly to a vehicle knuckle suitable for realizing weight reduction and maintenance of the rigidity in its arm portion.

BACKGROUND ART

Conventionally, there has been known a method for reducing the weight of a vehicle knuckle. For example, Patent Document 1 discloses a vehicle knuckle wherein a through hole communicating with an inside space of the arm portion is provided in a part around the extension axis of the peripheral wall of the arm portion extending from the main body portion.

PRIOR ART DOCUMENT

Patent Document 1: JP 2017-100,484 A

SUMMARY OF THE INVENTION

Problem

However, when a through hole is provided in a part of the peripheral wall of the arm portion around the extension axis, as in the vehicle knuckle disclosed in Patent Document 1, for example, the torsional stiffness of the arm portion about the extension axis may be reduced due to the through hole.

In view of the problems as noted above, it is an object of the present invention to provide a vehicle knuckle suitable for realizing weight reduction and maintenance of the rigidity in its arm portion.

Solution

The vehicle knuckle according to the present invention includes a main body portion for supporting an axle, a strut connecting portion for connecting a strut, and an arm portion for connecting the main body portion and the strut connecting portion and having a space inside. The arm portion includes a sidewall portion for connecting the main body portion and the strut connecting portion, and has a first through hole communicating with the space, at a coupling portion with the main body portion. The sidewall portion is free of a through-hole communicating with the space.

Preferably, in the configuration as described above, the arm portion has an end surface for defining the first through hole at the coupling portion.

Preferably, in the configuration as described above, the arm portion has a second through hole communicating with the space at a coupling portion with the strut connecting portion.

Preferably, in the configuration as described above, the sidewall portion includes four sidewalls.

Technical Effect

According to the present invention, it is possible to provide a knuckle for a vehicle that is suitable for realizing weight reduction and maintenance of the rigidity in the arm portion.

PREFERRED EMBODIMENT

Preferred embodiment of the present invention will be described below with reference to the drawings. In each figure, the same elements are denoted by the same reference numerals. Since the embodiment described below is presented as a specifically suitable example of the present invention, various technically preferred limitations may be made. However, unless otherwise explicitly noted below, the scope of the present invention is not limited to such an aspect.

Figure 1:
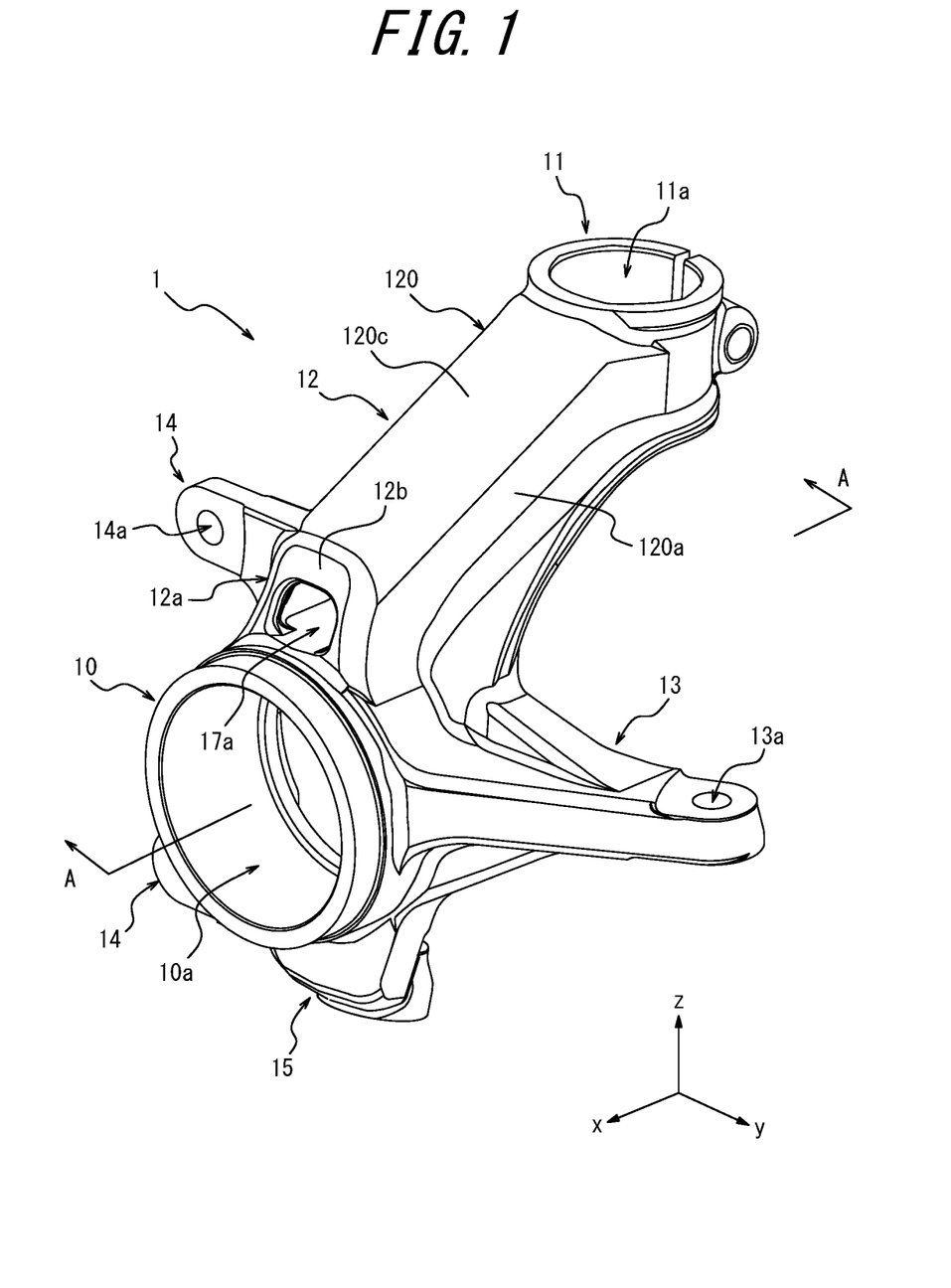
FIG. 1 is a perspective view showing an example of the vehicle knuckle according to one embodiment of the present invention.
Figure 2:
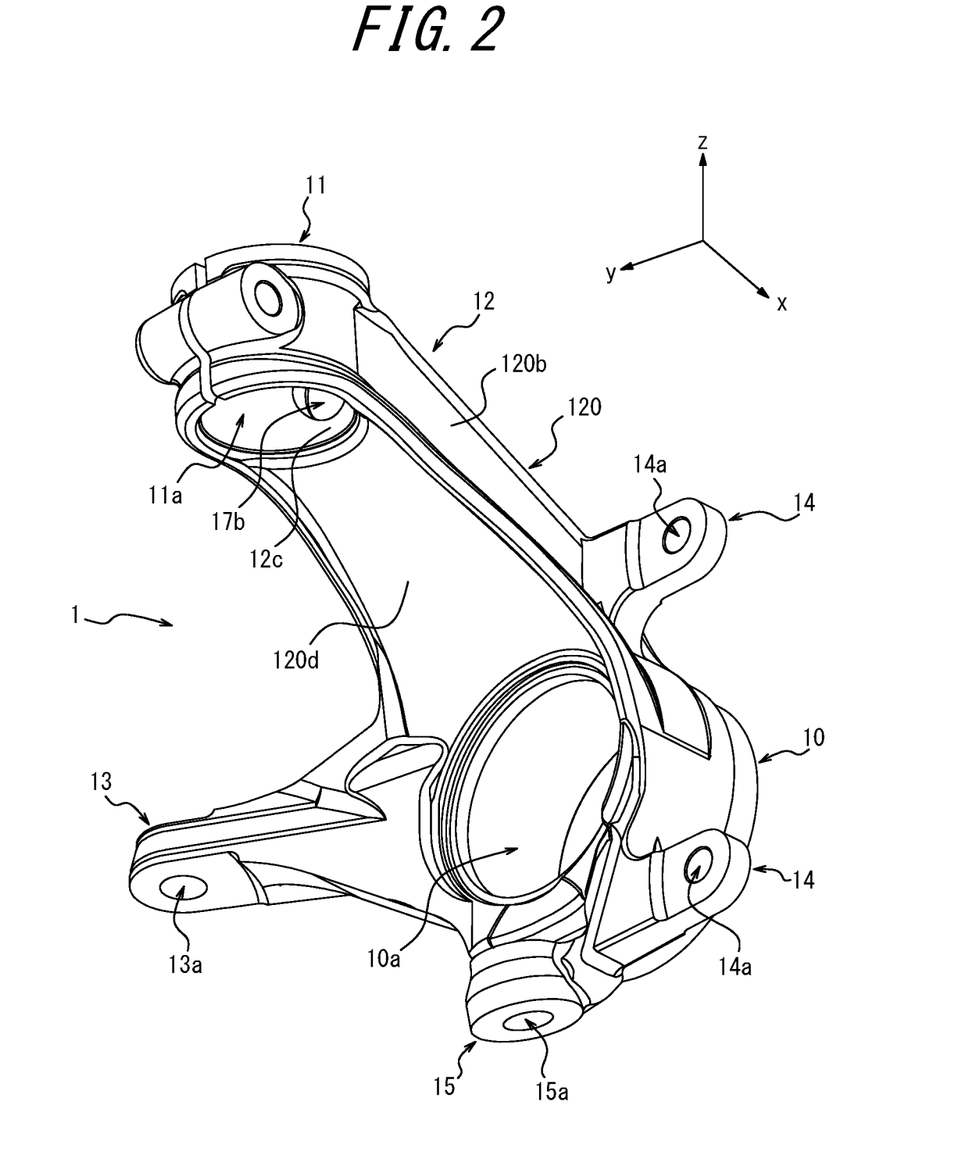
FIG. 2 is a perspective view of the vehicle knuckle of FIG. 1 as seen from another direction.

FIG. 1 is a perspective view showing an example of the vehicle knuckle according to an embodiment of the present invention. FIG. 2 is a perspective view of the vehicle knuckle 1 of FIG. 1 as seen from another direction. Specifically, FIG. 2 is a perspective view of the vehicle knuckle 1 of FIG. 1, as seen from a direction opposite to that of FIG. 1. FIGS. 1 and 2 show three-dimensional Cartesian coordinates including x-axis, y-axis and z-axis.

As shown in FIGS. 1 and 2, the vehicle knuckle 1 according to the present embodiment is integrally formed so as to have, for example, an integral structure. The vehicle knuckle 1 is made of metal, such as iron or aluminum. The vehicle knuckle 1 is manufactured, for example, by casting. However, the vehicle knuckle 1 may be manufactured by other methods including welding, processing and the like.

The vehicle knuckle 1 according to the present embodiment includes a main body portion 10, a strut connecting portion 11, an arm portion 12, a tie rod connecting portion 13, two brake connecting portions 14, and a lower arm connecting portion 15.

The main body portion 10 serves to suspend the vehicle body by supporting the axle. The main body portion 10 is formed to have an annular shape, with a center axis extending in the x-axis direction. The main body portion 10 has an axle hole 10a for passing the axle. The axle hole 10a has a shape that opens in the x-axis direction (i.e., it extends through the main body portion 10 in the x-axis direction). The main body portion 10 serves to suspend the vehicle body by supporting the axle in the axle hole 10a.

The strut connecting portion 11 is a portion for connecting the strut to the vehicle knuckle 1. The strut connecting portion 11 is formed to have an annular shape with a center axis extending in the z-axis direction. In the present embodiment, the strut connecting portion 11 is arranged on the negative side of the x-axis and the positive side of the z-axis with respect to the main body portion 10. Further, the main body portion 10 and the strut connecting portion 11 are arranged so that the center axis of the annular main body portion 10 and the center axis of the annular strut connecting portion 11 are located on the same x-z plane. However, the positional relationship between the main body portion 10 and the strut connecting portion 11 is not limited to the example as shown in the present embodiment, and may be appropriately determined according to the shape and the like of the parts to be attached to the vehicle knuckle 1. The strut connecting portion 11 has a strut shaft hole 11a for passing a strut (strut shaft). The strut shaft hole 11a has a shape that opens in the z-axis direction (i.e., it extends in the z-axis direction through the strut connecting portion 11). The strut is connected to the vehicle knuckle 1, for example, by clamping the strut shaft with the strut shaft inserted into the strut shaft hole 11a.

The arm portion 12 is a portion for connecting the main body portion 10 and the strut connecting portion 11. The arm portion 12 has a space inside for reducing the weight of the vehicle knuckle 1. The details of the structure of the arm portion 12 will be described later.

The tie rod connecting portion 13 is a portion for connecting a tie rod to the vehicle knuckle 1. The tie rod connecting portion 13 is formed, for example, as a portion that protrudes in the y-axis direction from the center of the main body portion 10 in the z-axis direction. In the example as shown in FIGS. 1 and 2, the tie rod connecting portion 13 is formed as a portion that protrudes in the positive direction of the y-axis from the main body portion 10. The tie rod is connected to the vehicle knuckle 1 at the tie rod connecting hole 13a.

The brake connecting portion 14 is a portion for connecting a brake caliper to the vehicle knuckle 1. The brake connecting portion 14 is formed, for example, as a portion that protrudes from the end portion of the main body portion 10 in the z-axis direction to the side opposite to the tie rod connecting portion 13 in the y-axis direction. In the example as shown in FIGS. 1 and 2, the brake connecting portion 14 is formed as a portion that protrudes from the main body portion 10 in the negative direction on the y-axis. The brake caliper is connected to the vehicle knuckle 1 at the brake connecting hole 14a.

The lower arm connecting portion 15 is a portion for connecting a lower arm to the vehicle knuckle 1. The lower arm connecting portion 15 is formed, for example, as a portion that protrudes from the end portion of the main body portion 10 in the negative direction of the z-axis toward the negative direction of the z-axis. The lower arm is connected to the vehicle knuckle 1 at the lower arm connecting hole 15a.

The vehicle knuckle 1 may further include a splash guard connecting portion. The splash guard connecting portion is a portion for connecting a splash guard to the vehicle knuckle 1. The vehicle knuckle 1 may include, for example, a plurality of splash guard connecting portions. When the vehicle knuckle 1 is provided with a plurality of splash guard connecting portions, the splash guard is attached to the vehicle knuckle 1 at a plurality of splash guard connecting portions, so that the stability of the attached state is further improved. A plurality of splash guard connecting portions may be provided on the outer circumference of the annular main body portion 10, for example. The splash guard may be connected to the vehicle knuckle 1 at the splash guard connecting hole formed in the splash guard connecting portion.

Figure 3:
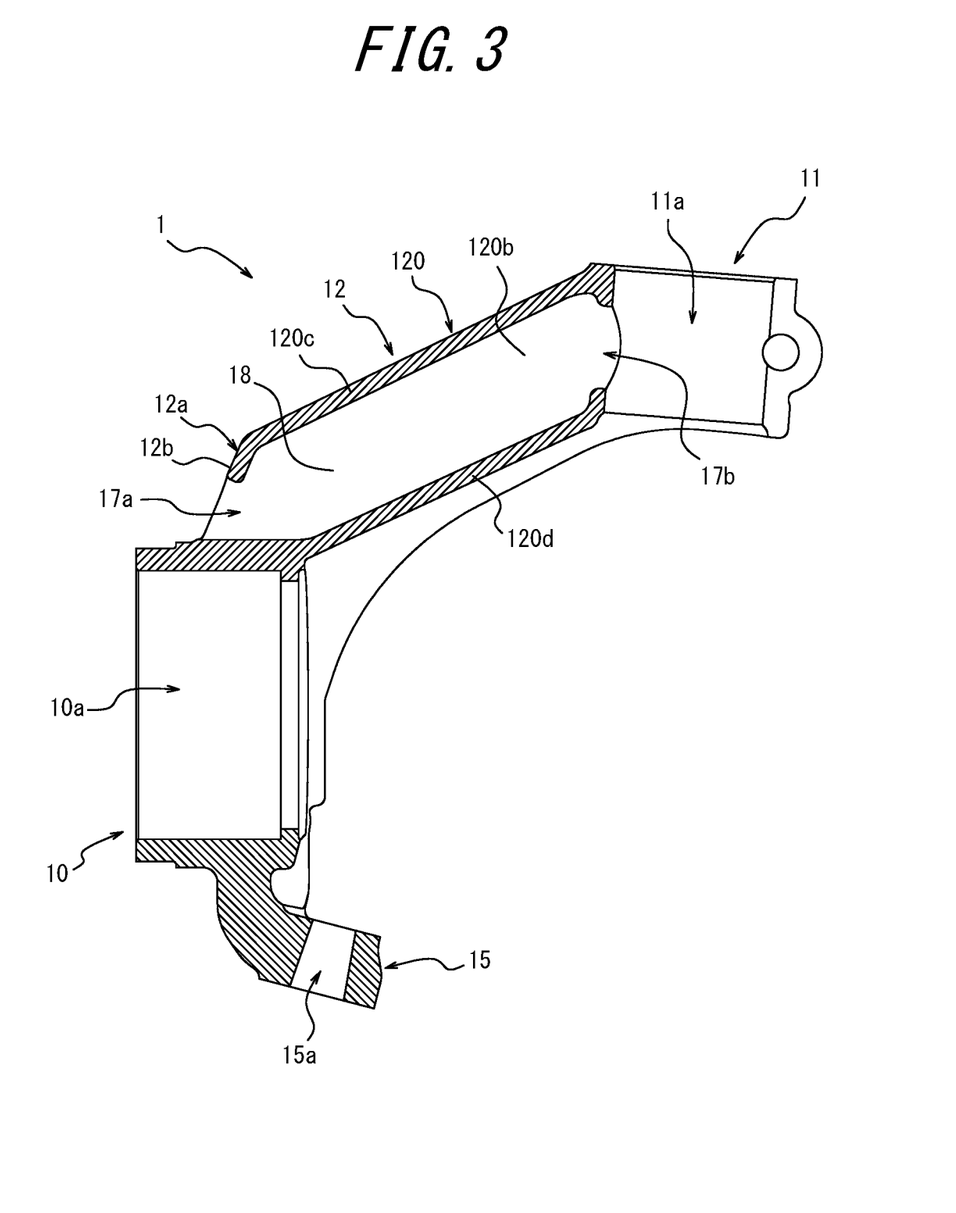
FIG. 3 is a sectional view of the vehicle knuckle taken along the line A-A of FIG. 1.

Next, with reference to FIGS. 1 to 3, the details of the structure of the arm portion 12 will be described. FIG. 3 is a sectional view taken along the line A-A of the vehicle knuckle of FIG. 1. Specifically, FIG. 3 shows a cross section of the vehicle knuckle 1 in the x-z plane including the center axis of the annular main body portion 10 and the center axis of the annular strut connecting portion 11, as seen in the y-axis positive direction side.

The arm portion 12 has a sidewall portion 120 for connecting the main body portion 10 and the strut connecting portion 11. The sidewall portion 120 does not have a through hole. The space 18 inside the arm portion 12 is partitioned from outside by the sidewall portion 120. The wall thickness of the sidewall portion 120 may be substantially uniform. The term "substantially uniform" means that the wall thickness is constant within the range of manufacturing error that may occur during manufacturing.

In the present embodiment, the sidewall portion 120 includes four sidewalls and has a substantially rectangular cross-section. The term "substantially rectangular cross-section" means not only the case where the cross-section is rectangular, but also the case where the connecting portion on the four sides in the cross-section has a curved surface or the like.

Specifically, in the present embodiment, the sidewall portion 120 of the arm portion 12 has a first sidewall 120a, a second sidewall 120b, a third sidewall 120c and a fourth sidewall 120d. The first sidewall 120a is a surface covering the side of the arm portion 12 in the y-axis positive direction side, and the second sidewall 120b is a surface covering the side of the arm portion 12 in the y-axis negative direction. In the present embodiment, since the strut connecting portion 11 is located on the side in the x-axis negative direction and the z-axis positive direction, with respect to the main body portion 10, the first sidewall 120a and the second sidewall 120b are each formed as a surface extending from the side in the x-axis positive direction and the z-axis negative direction to the side in the x-axis negative direction and the z-axis positive direction. The third sidewall 120c is a surface for covering the side of the first sidewall 120a and the second sidewall 120b in the z-axis positive direction, and the fourth sidewall 120d is a surface for covering the side of the first sidewall 120a and the second sidewall 120b in the z-axis negative direction.

The arm portion 12 has an end surface 12b at a coupling portion 12a with the main body portion 10 on the side in the x-axis positive direction. The end surface 12b is arranged so as to be located on the side of the outer peripheral surface of the annular main body portion 10 in the z-axis positive direction. In the present embodiment, the end surface 12b is provided so as to be inclined with respect to the y-z plane so that the side of the end face 12b in the z-axis positive direction is located on the side in the x-axis negative direction closer than the side in the z-axis negative direction. However, the end surface 12b may be provided along the y-z plane. The end surface 12b defines a first through hole 17a. The first through hole 17a communicates the space 18 with the outside.

The arm portion 12 has a second through hole 17b in the coupling portion 12c with the strut connecting portion 11 on the side in the x-axis negative direction. The second through hole 17b communicates the space 18 with the outside. In the present embodiment, the side of the arm portion 12 in the x-axis negative direction is connected to a part of the annular sidewall surface forming the strut connecting portion 11. That is, the coupling portion 12c on the side of the arm portion 12 in the x-axis negative side is formed by the sidewall of the strut connecting portion 11. The arm portion 12 has the second through hole 17b at the coupling portion 12c on the side in the x-axis negative direction.

As described above, in the present embodiment, the arm portion 12 is provided on the sidewall portion 120 having no through hole and two through holes (that is, the first through hole 17a and the second through hole 17b) provided in the coupling portions 12a and 12c on the side of the sidewall portion 120 in the x-axis positive direction and the side in the x-axis negative direction. The space 18 is provided inside the arm portion 12. That is, the arm portion 12 is hollow. The space 18 inside the arm portion 12 communicates with the outside through the first through hole 17a and the second through hole 17b.

The vehicle knuckle 1 according to the present embodiment has a reduced weight due to the provision of the space 18 inside the arm portion 12, as described above. Further, since the vehicle knuckle 1 according to the present embodiment does not have a through hole in the sidewall portion 120, the rigidity of the vehicle knuckle 1 is less likely decreased as compared with the case where the sidewall portion 120 has a through hole. Thus, it is possible to maintain the rigidity.

Here, with respect to the rigidity of the arm portion 12, explanation will be made of simulations that have been conducted by the inventors. The inventors conducted simulations in order to confirm the superiority of the arm portion 12 according to the present embodiment with respect to the rigidity. In the simulations, the inventors compared the rigidity of two types of structures that imitated the arm portion of a vehicle knuckle.

Figure 4A:
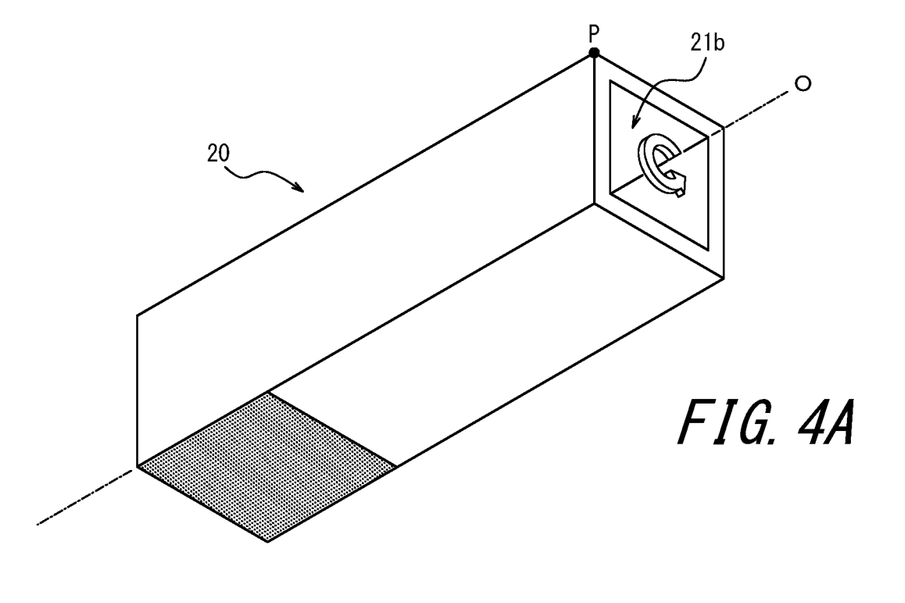
FIG. 4 schematically shows the structure imitating the arm portion for use in the simulation.
Figure 4B:
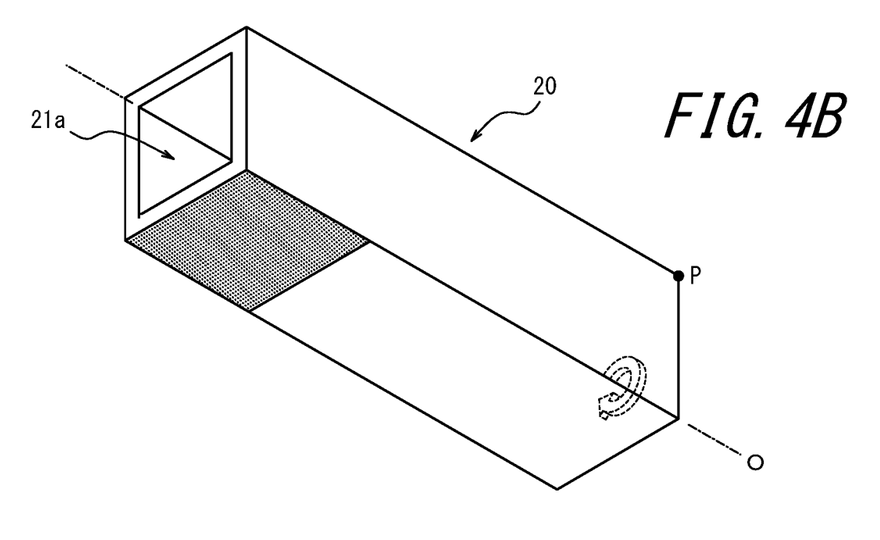
Figure 5A:
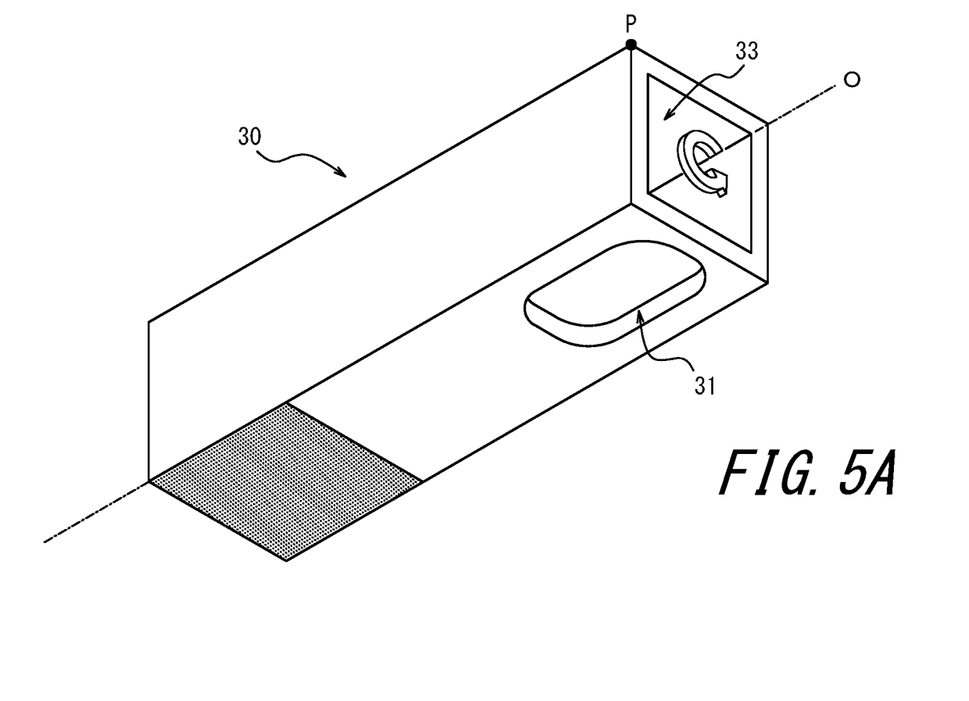
FIG. 5 schematically shows the structure imitating the arm portion for use in the simulation.
Figure 5B:
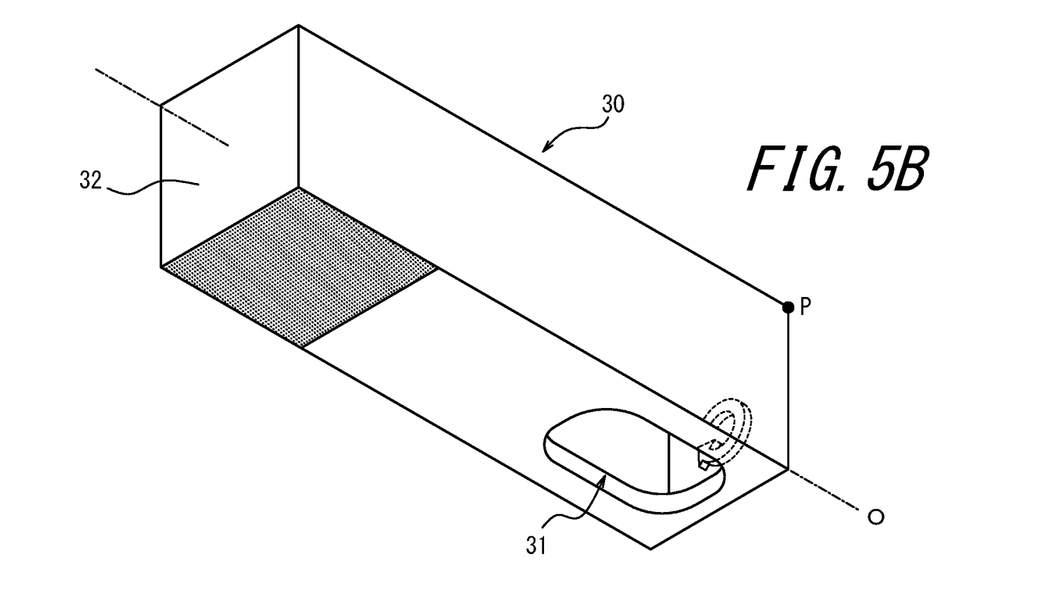

FIGS. 4 and 5 are schematic views showing the structures imitating the arm portion used for the simulations. In each of FIGS. 4 and 5, A and B are views of the structure imitating the arm portion as seen from different angles.

FIG. 4 schematically shows the structure imitating the arm portion 12 of the vehicle knuckle 1 according to the present embodiment, which has been described above with reference to FIGS. 1 to 3. The structure shown in FIG. 4 includes a sidewall portion 20 comprised of four sidewalls having no through holes. Through holes 21a and 21b are provided at both ends of the sidewall portion 20, respectively. The sidewall portion 20 in the structure of FIG. 4 corresponds to the sidewall portion 120 of the arm portion 12 in the above embodiment. Further, the through holes 21a and 21b in the structure of FIG. 4 correspond to the first through hole 17a and the second through hole 17b in the above embodiment, respectively.

FIG. 5 schematically shows the structure imitating the arm portion 12 used as a comparative example. The structure shown in FIG. 5 includes a sidewall portion 30 comprised of four sidewalls as in FIG. 4; however, unlike FIG. 4, a through hole 31 is provided in one sidewall. An end surface 32 is provided at one end of the sidewall portion 30, and a through hole 33 is provided at the other end.

In the structures shown in FIGS. 4 and 5, the shapes and sizes of the sidewall portions 20 and 30 are the same.

In the simulations, with respect to the structures shown in FIGS. 4 and 5, the amount of displacement and the angle of rotation about an axis O were measured at a point P with respect to a predetermined position, with one end side fixed and the other side applied with a moment in the rotation direction about the axis O. The fixed part in the simulation is a predetermined range on one end side of one of the four sidewalls of the sidewall portions 20 and 30. In the structure shown in FIG. 5, a predetermined range on one end side of the surface having the through hole 31 was fixed. In FIGS. 4 and 5, the fixed portions in the simulation are shaded, and the applied moments are schematically indicated by arrows. The axis O is an axis about which the sidewall portions 20 and 30 are rotationally symmetric.

Figure 6:
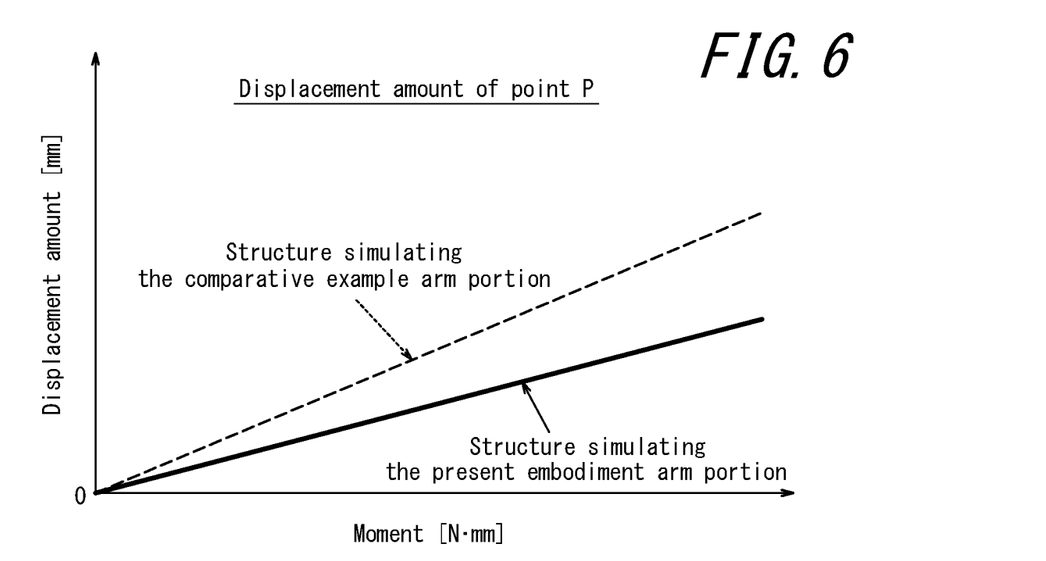
FIG. 6 shows the simulation results.
Figure 7:
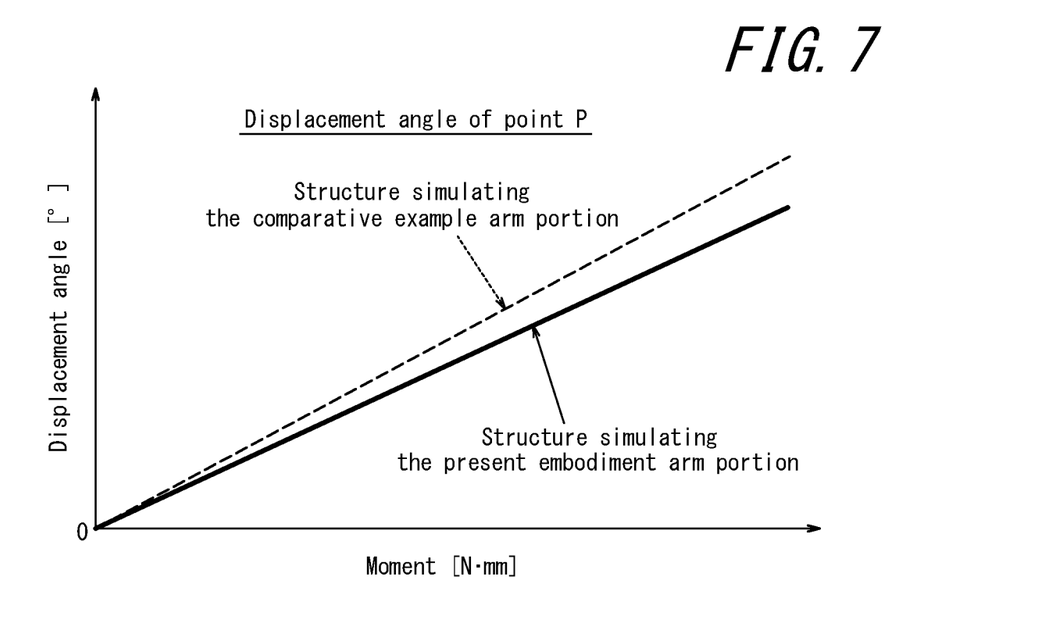
FIG. 7 also shows the simulation results.

FIGS. 6 and 7 are diagrams showing the simulation results. Specifically, FIG. 6 is a diagram showing the amount of displacement of the point P, and FIG. 7 is a diagram showing the displacement angle of the point P about the O-axis.

In FIG. 6, the horizontal axis shows the moment applied to the other end side, and the vertical axis shows the displacement amount of the point P. It can be seen from FIG. 6 that, when the same moment is applied, the displacement amount of the point P is smaller in the structure imitating the arm portion of the present embodiment (i.e., the structure shown in FIGS. 4A and 4B), than in the structure imitating the arm portion of the comparative example (i.e., the structure shown in FIGS. 5A and 5B). From this, it may be recognized that the structure having through holes on both end sides as in the present embodiment is higher in rigidity than the structure having through holes on one end side and the sidewall portion as in the comparative example.

In FIG. 7, the horizontal axis shows the moment applied to the other end side, and the vertical axis shows the displacement angle of the point P. It can be seen from FIG. 7 that, when the same moment is applied, the structure imitating the arm portion of the present embodiment is smaller in the displacement angle of the point P than in the structure imitating the arm portion of the comparative example. From this, it can be said that the structure having through holes on both ends as in the present embodiment has higher rigidity than the structure having through holes on one end side and the sidewall portion as in the comparative example.

In this way, the vehicle knuckle 1 according to the present embodiment makes it possible to realize the weight reduction due to the provision of a space 18 inside the arm portion 12, and to maintain the rigidity, in particular, the torsional rigidity, due to the configuration of the sidewall portion 120 of the arm portion 12 that is not provided with a through hole, as compared to the sidewall portion 120 of the arm portion 12 with a through hole. In the embodiment described above, while the sidewall portion 120 of the arm portion 12 has been explained as including four sidewalls, it is not a prerequisite condition for the sidewall portion 120 to include four sidewalls. The sidewall portion 120 may include, for example, three sidewalls or five or more sidewalls, or may even be formed in a cylindrical shape.

Further, in the vehicle knuckle 1 according to the present embodiment, since the arm portion 12 is provided with a first through holes 17a and a second through holes 17b at both ends of the sidewall portion 120, when, for example, the vehicle knuckle 1 is immersed in a paint for painting, the air within the space 18 inside the arm portion 12 can be expelled to the outside, and it is thus possible to suppress generation of unpainted portion inside the space 18. Even if the vehicle knuckle 1 is not provided with through holes at both ends of the arm portion 12, if the knuckle 1 has at least one through hole, it is still easy to suppress generation of unpainted portion inside the space 18.

In the embodiment described above, while the arm portion 12 of the vehicle knuckle 1 has been explained as having an end surface 12b at the coupling portion 12a with the main body portion 10, the provision of the end face 12b is not a prerequisite condition. In this case, the main body portion 10 side of the arm portion 12, in its entirety, functions as the first through hole 17a. The vehicle knuckle 1 has at least the first through hole 17a at the coupling portion 12a between the arm portion 12 and the main body portion 10, so that the space 18 inside and the outside can be communicated with each other. If the arm portion 12 has an end surface 12b at the coupling portion 12a with the main body portion 10, when manufacturing the vehicle knuckle 1, it is easy to suppress generation of burrs at the coupling portion 12a with the main body portion 10.

The present invention is not limited to the configuration specified in each of the above-described embodiment, and various modifications may be made without departing from the scope as defined by the appended claims.

INDUSTRIAL APPLICABILITY

The present invention is applicable to vehicle knuckles for use in automobiles and various other vehicles.

REFERENCE NUMERALS

1 Vehicle knuckle
10 Main body portion
10a Axle hole
11 Strut connecting portion
11a Strut shaft hole
12 Arm portion
12a, 12c Coupling portion
12b, 32 End surface
13 Tie rod connecting portion
13a Tie rod connecting hole
14 Brake connecting portion
14a Brake connecting hole
15 Lower arm connecting portion
15a Lower arm connecting hole
17a First through hole
17b Second through hole
18 Space
20, 30, 120 Sidewall portion
21a, 31, 33 Through hole
120a First sidewall
120b Second sidewall
120c Third sidewall
120d Fourth sidewall

The invention claimed is:

1. A vehicle knuckle, comprising:
a main body portion for supporting an axle;
a strut connecting portion for connecting a strut;
an arm portion for connecting the main body portion and the strut connecting portion, and having a space inside; and
a coupling portion for connecting the arm portion and the main body portion, wherein:
the arm portion includes a sidewall portion for connecting the main body portion and the strut connecting portion,
the coupling portion has an end surface which is located on an outer peripheral surface of the main body portion and which extends in a direction crossing a direction the arm portion extends and a direction the outer peripheral surface of the main body portion extends, in a cross section by a plane including a center axis of the main body portion and a center axis of the strut connecting portion,
the end surface is provided with a first through hole communicating with the space, and
the sidewall portion is free of a through hole communicating with the space and extends along the direction the arm portion extends.

2. The vehicle knuckle according to claim 1, wherein the arm portion has a second through hole communicating with the space at a coupling portion with the strut connecting portion.

3. The vehicle knuckle according to claim 2, wherein the sidewall portion includes four sidewalls.

4. The vehicle knuckle according to claim 1, wherein the sidewall portion includes four sidewalls.

\* \* \* \* \*